Patented Mar. 23, 1926.

1,577,723

UNITED STATES PATENT OFFICE.

EDWARD M. HUGHES, OF CHESTER, PENNSYLVANIA, ASSIGNOR TO SUN OIL COMPANY, OF PHILADELPHIA, PENNSYLVANIA, A CORPORATION OF NEW JERSEY.

PROCESS OF MAKING ORGANIC-ACID SOAP FROM MINERAL OILS.

No Drawing.   Application filed July 2, 1918.   Serial No. 242,989.

*To all whom it may concern:*

Be it known that I, EDWARD M. HUGHES, a citizen of the United States, residing at Chester, county of Delaware, and State of Pennsylvania, have invented a new and useful Improvement in Processes of Making Organic-Acid Soap from Mineral Oils, of which the following is a full, clear, and exact description.

The object of my invention is the production, from mineral oil, of a cutting oil possessing essentially the qualities of cutting oils heretofore produced in part from oils derived from animal and vegetable sources.

It will be understood that the following description applies only to preferred ways of carrying out my process, the efficiency of which has been demonstrated by actual use, and is not intended to limit or restrict the invention within a narrower scope than is defined in the claims.

While any crude petroleum is possibly or probably adaptd for use in the execution of my process, I prefer to use Texas crude oil, or a crude petroleum of that grade.

I take the crude petroleum and subject it to a preliminary distillation in which all of the crude product is distilled off except a relatively small percentage of residuum. The distillates are then subjected to a second distillation, the heavier product remaining in the still being the stock from which lubricating oil may be made. The second distillate is then redistilled, light oils being distilled off, the part remaining also being adapted for use as lubricating stock.

The lubricating stock is transferred to an agitator, wherein it is treated with an acid, preferably sulfuric acid. The use of sulfuric anhydride, or even fuming acid, should be avoided, in order to avoid the formation of sulfo-acids. After agitation and settlement the "sludge" is drawn off. The stock is then transferred to a second agitator, wherein it is treated with caustic soda or other suitable alkali. It is common, at this stage of the operation, to wash repeatedly with water, to effect the complete removal of the acid and alkali, which, together with the organic or fatty acids, are wasted. In my process, however, the operation is conducted, preferably, without any washing with water and great care is exercised with respect to duration of treatment and temperature. The stock is allowed to settle and the precipitated emulsion is drawn off.

This emulsion comprises a soap consisting of a sodium salt of the organic or fatty acids or organic compounds in or derived from the crude oil, together with a certain amount of free alkali, considerable water containing chiefly sodium sulfate and probably some sodium bisulfate and other salts due to the reaction of acid and alkali, and some unsaponifiable mineral oil.

This soapy liquid precipitate from the caustic soda agitation is then treated in a separate agitator, into which I introduce, from time to time, dilute mineral acid, preferably sulfuric acid. The amount and strength of acid added depends upon factors which are more or less variable, such as the richness of the soaps, the amount of free alkali, and the water content. It is, however, desirable that the amount of water in the hydrolyzing solution shall be sufficient to dissolve all the salts. It is desirable, also, to secure, as near as possible, uniformity in different batches of the ultimate product, and in order that the constituents of the emulsion shall be approximately uniform, I usually find it advisable to add, before the acid treatment, more or less water in the form of a salt solution, preferably a solution of sodium sulfate. The total amount of water, added as such, or as a salt solution, or as weak acid, and including the water alredy present in the precipitate, should approach the total amount of liberated saponifiable oils plus dissolved or suspended mineral oils. Upon settlement, the precipitate, which consists chiefly of sodium sulfate, some sodium bisulfate and water, is drawn off. The remainder is a water-insoluble organic acid or saponifiable oil, is practically, but not absolutely, odorless, does not become rancid, has a negligible sulfur content (about 0.2 per cent, probably existing as sulfates that have not been completely removed) and when saponified displays the principal qualities of ordinary soap derived from animal and vegetable oil.

This product is then heated and saponified with caustic soda or other suitable alkali, making a soap approximately free from water. A hot solution of approximately 51

Bé. NaOH has been used with very good results. In order to keep the soap bright, the water content is controlled by the strength of the alkali solution. Approximately one to seven per cent of water is permitted to remain in the soap, but the quantity of water incorporated is controlled by the product desired. This soap is then mixed with from ten to ninety per cent of mineral oil, the percentage of the latter varying with the percentage of dissolved mineral oil already in the soap. An addition of from thirty or forty to sixty per cent of mineral oil is ordinarily desirable, dependent upon the saponification value of the saponifiable matter mixed with mineral oil, and produces a cutting oil that forms a practically perfect and permanent milk white emulsion with water, which may be added by the user in about the proportion of seven to twenty per cent.

Having now fully described my invention, what I claim and desire to protect by Letters Patent is:

1. The process of making cutting oil exclusively from mineral oil which comprises distilling from crude petroleum a relatively heavy distillate adapted for lubricating oil stock, treating the same with a mineral acid, drawing off the precipitate, treating the remaining body of acid-containing oil with an alkali, separating out the precipitated emulsion comprising soap, salt water, and some free alkali and unsaponifiable mineral oil, decomposing the soap with a relatively weak solution of a mineral acid, separating out the precipitate of water and salts, saponifying the remaining product, and mixing it with mineral oil, thereby producing a cutting oil which, when mixed with water, forms a milk-white and substantially perfect emulsion.

2. The process of making a permanent emulsion containing water and mineral oil, which comprises distilling from crude petroleum a relatively heavy distillate adapted for lubricating oil stock, treating the same with a mineral acid, drawing off the precipitate, treating the remaining body of acid-containing oil with an alkali, separating out the precipitated emulsion comprising soap, salt water, and some free alkali and unsaponifiable mineral oil, decomposing the soap with a relatively weak solution of a mineral acid, separating out the precipitate of water and salts, saponifying the remaining product, mixing the saponified product with mineral oil to form a cutting oil, and mixing such cutting oil in a preponderating proportion with water.

3. The process of making cutting oil exclusively from mineral oil which comprises distilling from crude petroleum a relatively heavy distillate adapted for lubricating oil stock, treating the same with a mineral acid, drawing off the precipitate, treating the remaining body of acid-containing oil with an alkali, separating out the precipitated emulsion comprising soap, salt water, and some free alkali and unsaponifiable mineral oil, adding a salt solution, decomposing the soap with a relatively weak solution of a mineral acid, separating out the precipitate of water and salts, saponifying the remaining product, and mixing it with mineral oil.

In testimony of which invention, I have hereunto set my hand, at Philadelphia, on this 29th day of June, 1918.

EDWARD M. HUGHES.